United States Patent [19]

Erhard et al.

[11] Patent Number: 5,165,022
[45] Date of Patent: Nov. 17, 1992

[54] CHANNEL AND CONTROL UNIT HAVING A FIRST I/O PROGRAM PROTOCOL FOR COMMUNICATION WITH A MAIN PROCESSOR AND A SECOND UNIVERSAL I/O PROGRAM PROTOCOL FOR COMMUNICATION WITH A PLURALITY OF I/O ADAPTERS

[75] Inventors: John J. Erhard, Newark Valley; Raymond E. Losinger, Endicott; Daniel J. Sucher, Vestal, all of N.Y.

[73] Assignee: International Business Machines Corporation, Armonk, N.Y.

[21] Appl. No.: 799,930

[22] Filed: Nov. 26, 1991

Related U.S. Application Data

[63] Continuation of Ser. No. 425,780, Nov. 23, 1989, abandoned.

[51] Int. Cl.⁵ .................. G06F 13/10; G06F 13/42
[52] U.S. Cl. ............................ 395/275; 395/325; 364/284.2; 364/229.1; 364/238.3; 364/228; 364/240.8; 364/DIG. 1
[58] Field of Search ... 364/200 MS File, 900 MS File, 364/DIG. 1, DIG. 2; 395/275, 325; 370/27, 43; 340/825.03, 825.52

[56] References Cited

U.S. PATENT DOCUMENTS

| | | | |
|---|---|---|---|
| 4,319,323 | 3/1982 | Ermolovich et al. | 395/325 |
| 4,371,928 | 2/1983 | Barlow et al. | 395/425 |
| 4,393,501 | 7/1983 | Kellogg et al. | 371/33 |
| 4,456,957 | 6/1984 | Schieltz | 364/200 |
| 4,493,021 | 1/1985 | Agrawal et al. | 364/200 |
| 4,494,194 | 1/1985 | Harris et al. | 364/200 |
| 4,506,324 | 3/1985 | Healy | 364/200 |
| 4,513,373 | 4/1985 | Sheets et al. | 364/200 |
| 4,514,823 | 4/1985 | Mendelson et al. | 395/275 |
| 4,547,880 | 10/1985 | DeVita et al. | 370/91 |
| 4,631,666 | 12/1986 | Harris et al. | 364/200 |
| 4,646,232 | 2/1987 | Chang et al. | 364/200 |
| 4,683,530 | 7/1987 | Quatse | 395/275 |
| 4,720,828 | 1/1988 | Jones | 370/85 |
| 4,730,308 | 3/1988 | Friedman et al. | 370/85 |
| 4,744,078 | 5/1988 | Kowalczyk | 370/85 |
| 4,768,150 | 8/1988 | Chang et al. | 364/300 |
| 4,777,591 | 10/1988 | Chang et al. | 364/200 |
| 4,787,028 | 11/1988 | Finfrock et al. | 364/200 |
| 4,827,409 | 5/1989 | Dickson | 395/250 |
| 4,845,609 | 7/1989 | Lighthart et al. | 364/200 |
| 4,855,905 | 8/1989 | Estrada et al. | 364/200 |
| 4,882,674 | 11/1989 | Quint et al. | 364/200 |
| 4,882,727 | 11/1989 | Williams et al. | 370/79 |
| 4,941,089 | 7/1990 | Fischer | 364/200 |
| 4,943,978 | 7/1990 | Rice | 375/1 |
| 4,961,140 | 10/1990 | Pechanek et al. | 364/200 |
| 4,975,828 | 12/1990 | Wishneusky et al. | 364/200 |
| 4,975,830 | 12/1990 | Gerpheide et al. | 395/200 |
| 5,008,879 | 4/1991 | Fischer et al. | 370/85.2 |
| 5,056,058 | 10/1991 | Hirata et al. | 395/325 |
| 5,060,140 | 10/1991 | Brown et al. | 364/200 |

OTHER PUBLICATIONS

IBM System/370 Principles of Operation-GA22 -70-0-6 Seventh Edition, Mar. 1980-IBM Corp.
Microprocessing and Microprogramming, vol. 9, 1982, May #5, "A Microprocessor Based protocol converter for the direct connection of a Mainframe to a Packet Switched Network".

Primary Examiner—Michael R. Fleming
Assistant Examiner—Gopal C. Ray
Attorney, Agent, or Firm—Arthur J. Samodovitz

[57] ABSTRACT

A computer system has a universal channel and control unit to interface, with a minimum complexity, to a plurality of different I/O adapters such as a Token Ring adapter or an Ethernet adapter. The system comprises a main processor with main memory, an I/O processor coupled to the main processor by a bus, and a channel program which runs on the I/O processor. The channel program accesses the processor and main memory. The channel program and main processor communicate with a first I/O program protocol. A control unit program also runs on the I/O processor and interfaces the channel program to a plurality of different I/O adapters with a second relatively simple, universal I/O program protocol. Each of the I/O adapters also has a different I/O program protocol than the other I/O adapters and the first I/O protocol, for communication with their respective device.

6 Claims, 4 Drawing Sheets

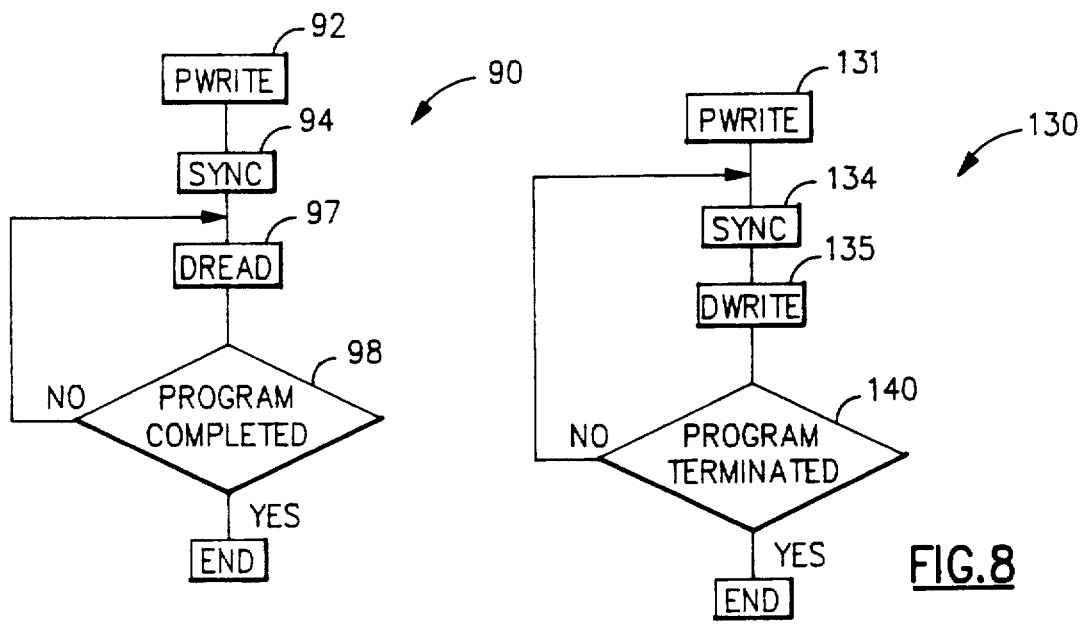
FIG.6
FIG.8
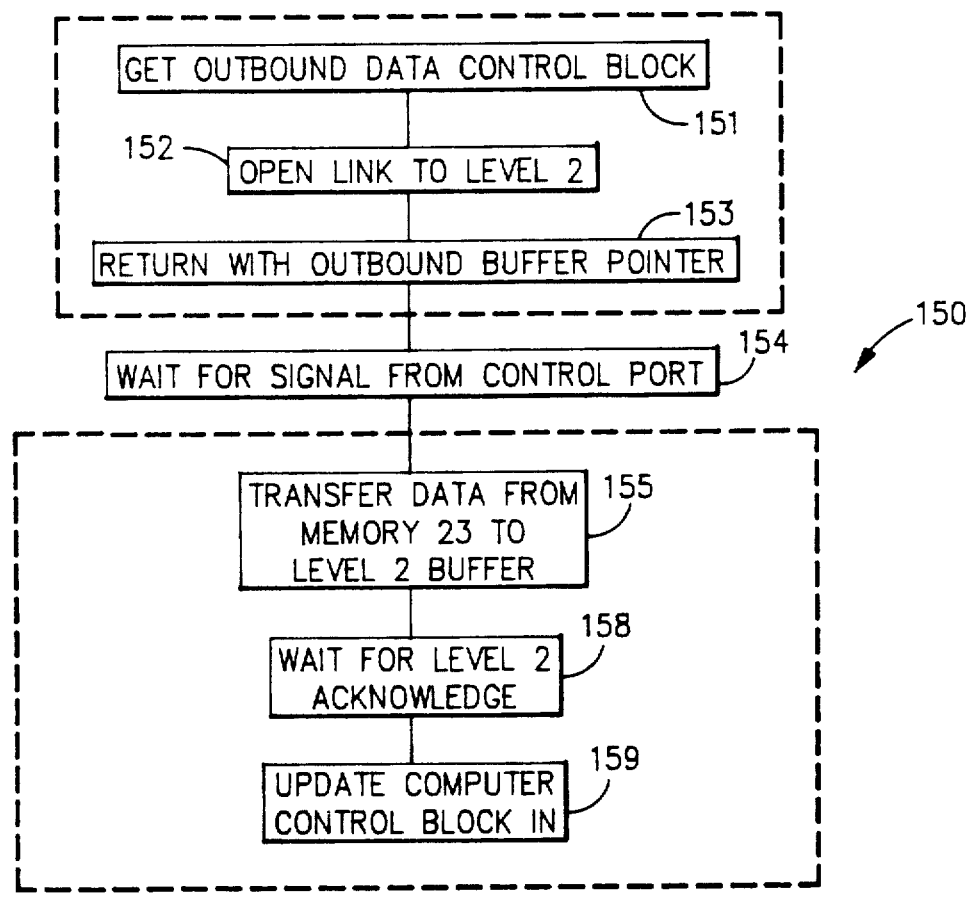
FIG.9

CHANNEL AND CONTROL UNIT HAVING A FIRST I/O PROGRAM PROTOCOL FOR COMMUNICATION WITH A MAIN PROCESSOR AND A SECOND UNIVERSAL I/O PROGRAM PROTOCOL FOR COMMUNICATION WITH A PLURALITY OF I/O ADAPTERS

This application is a continuation of application Ser. No. 07/425,780, filed Oct. 23, 1989, now abandoned.

BACKGROUND OF THE INVENTION

The invention relates generally to an interface within a computer system between two different protocols. The invention deals more particularly with a control unit which provides a universal interface between a variety of I/O protocols and another computer protocol.

A computer protocol is a set of systematic and syntactic rules that define the manner of communication between two components. For example, in IBM Corporation's system network architecture (SNA), the protocols define the meanings of and sequencing rules for requests and responses used for managing the network, transferring the data and synchronizing the states of network components.

In many types of computer systems, a main computer communicates with a variety of peripheral devices. For example, in IBM Corporation's 9370 Computer System, ("9370" is a trademark of IBM Corporation) a computer communicates with a variety of I/O devices such as printers, DASD storage devices, personal computers, etc. This communication is sometimes made via a token ring adapter and token ring network or an ethernet adapter and ethernet network. Heretofore, a different control unit was provided between a channel of the main computer and each such adapter in the aforesaid example. In other computer systems, a different control unit was also provided between the main computer channel and each adapter for the peripheral devices. The need for the different control units complicated the design, and the addition of new peripheral devices required the development and installation of new control units.

Also, in the aforesaid 9370 system, the System 370 protocol was more complicated than necessary for the token ring or ethernet adapters, i.e. they provided more options and functions than required, and more steps and fields to implement. Moreover, in this system, the channels and control units were separated from the System 370 computer by a cable, and this separation required safeguards which added to the complexity of the system.

Accordingly, a general object of the present invention is to provide a control unit for a computer communication interface, which control unit is universally applicable to a variety of different I/O devices or adapters therefor.

Another general object of the present invention is to provide a control unit of the foregoing type which provides a less complicated interface to the I/O devices or adapters than required for the main computer channel.

A more specific object of the present invention is to provide a control unit of the foregoing type which is reusable between a System 370 main computer and a token ring adapter, an ethernet adapter or other I/O devices.

Another specific object of the present invention is to simplify the interface between the control unit and the main computer.

SUMMARY OF THE INVENTION

The invention resides in a computer system having a universal channel and control unit to interface to a plurality of different I/O adapters or devices. The system comprises a main processor and associated memory, and a channel, coupled to the processor and memory, to access the processor and memory. The channel has a first I/O protocol. A bus is connected between the processor/memory and the channel, and a control unit is connected to the channel and the bus, and interfaces the channel to a plurality of different I/O adapters or devices. Each of the I/O adapters or devices has a different protocol than the other I/O adapter or device and different than the first I/O protocol. The control unit is preferably integrated with the main processor.

BRIEF DESCRIPTION OF THE FIGURES

FIG. 6 is a flowchart illustrating an inbound data port channel program comprising commands which are generated by the main computer and presented to the inbound data port of the common channel and control unit.

FIG. 8 is a flowchart illustrating an outbound data port channel program comprising commands which are generated by the main computer and presented to the outbound data port of the common channel and control unit.

FIG. 9 is a flowchart of microcode executed by the outbound data port in response to the channel program of FIG. 8.

DETAILED DESCRIPTION OF THE PREFERRED EMBODIMENTS

Figure 1:
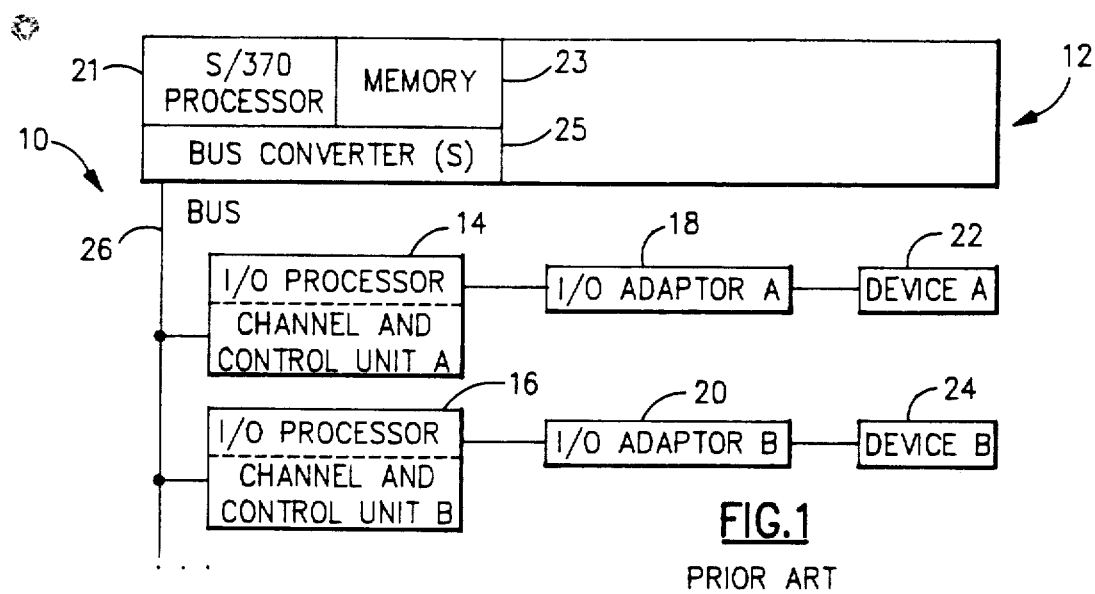
FIG. 1 is a block diagram illustrating a main computer, two different I/O devices, two different adapters therefor, and two different channel and control units, one for each adapter, according to the prior art.

Referring now to the drawings in detail wherein like reference numerals indicate like elements throughout the several views, FIG. 1 illustrates a computer system generally designated 10 according to the prior art. System 10 comprises a main computer 12, two different channel and control units 14 and 16 which include respective I/O processors, I/O adapters 18 and 20, and I/O devices 22 and 24. Main computer 12 has a 9370 architecture including a processor 21 such as an IBM 9370 model 30 processor, memory 23, and a bus converter 25. The IBM S/370 architecture is described in more detail in "IBM System/370 Principles of Operation" Eleventh Edition, IBM Corp. order number GA22-7000, published September 1987 by IBM Corp. of Armonk, N.Y., is described in more detail in which manual is hereby incorporated by reference as part of the present disclosure. Channel and control units 14 and 16 comprise microcode which is executed on the respective I/O processor. A bus 26 connects main computer 12 to channel and control units 14 and 16. Each channel and control unit is specially coded for the respective I/O adapter 18 and 20, and provides an interface between the respective I/O adapter and main computer 12. In system 10, device 22 is a token ring network and device 24 is an ethernet network.

Figure 2:
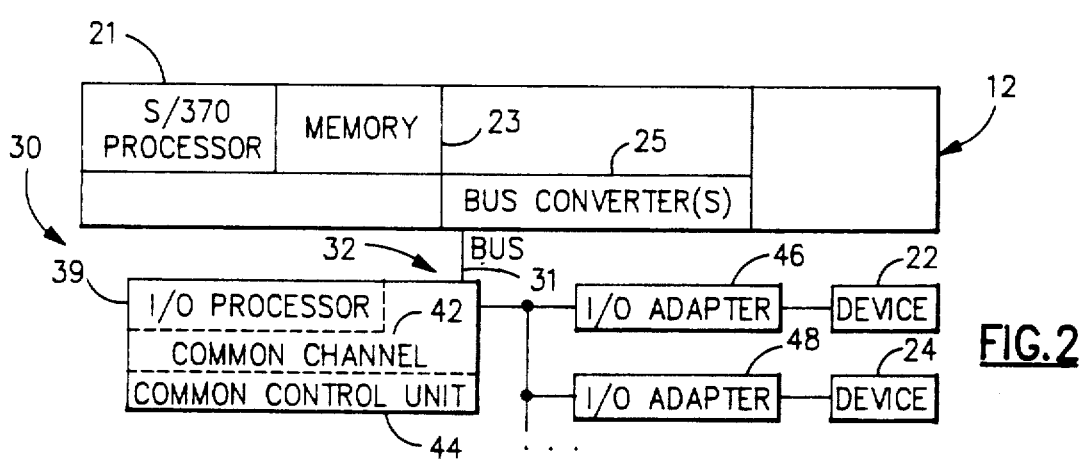
FIG. 2 is a block diagram illustrating a main computer, two different I/O devices, two different adapters therefor, and a channel and control unit which is common to both adapters, according to the present invention.

Focusing now on the present invention, FIG. 2 illustrates a computer system generally designated 30. System 30 comprises main computer 12, adapters 46 and 48, I/O devices 22 and 24, a bus 31, and a common channel and control unit 32. The common channel and control unit 32 comprises an I/O processor 39, a common channel 42 and a common control unit 44, and embodies the present invention. Both channel 42 and control unit 44 are provided by subsystem microcode which is executed on I/O processor 39. In the illustrated example, processor 21 initiates a S/370 channel program, and control unit 44 implements a continuously executing transfer interface (CETI) program running on I/O processor 39.

First, control unit 44 opens communications with channel 42 during initialization of the control unit. Then, when the channel program initiates a PWRITE channel control word (CCW) (step 92 or 131 described in more detail below), the control unit 44 opens a communication with adapter 46 or 48.

Figure 3:
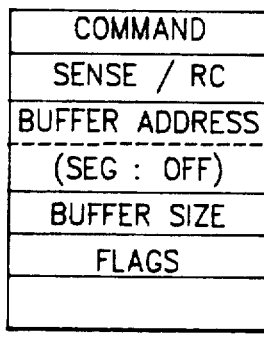
FIG. 3 is a block diagram of a command block structure of the interface between the common channel and control unit and the I/O adapters of FIG. 2.

The control unit 44 and I/O adapters 46 and 48 communicate with each other by means of a message passing service provided by the I/O subsystem kernel. The service comprises kern_send, kern_request, kern_receive, and kern_reply routines. Each of these messages consists of a command block of format 50 illustrated in FIG. 3 and defined as follows:

Command: The command field determines the function performed by either the control unit 44 or the I/O adapter which is involved in the communication.

Sense/Return Code: This code is used to indicate error conditions. The CETI program will use this data provided by the I/O adapter to set a System 370 sense data field. In the illustrated embodiment, this code comprises two fields, a status field and a set flag.

Buffer Address: The buffer address is set by the I/O adapter 46 or 48. In the illustrated embodiment, the buffer address comprises an indirect buffer address (IBA) flag. If the IBA flag is zero, then this indicates that a single data buffer within the adapter contains the current message. On the other hand, if the IBA flag is one, then this indicates a list of data buffers within the adapter which contains the current message. The control unit 42 actually transfers the CETI messages between the memory 23 within main computer 12 and the adapter buffers.

Buffer Size: The buffer size indicates the size of the buffer adapter described above. In the illustrated embodiment, the control unit 42 does not transfer more than the aforesaid buffer size bytes into the adapter buffer. If the IBA flag is one, then the buffer size indicates the sum of the counts in the buffer address list described above.

Flag: In the illustrated embodiment, there is a single flag which is the IBA flag noted above, which flag is set and reset by the adapter 46 or 48 which is involved in the communication. When the IBA flag is zero, then the buffer address and buffer size described above directly specify the adapter buffer address. Conversely, when the IBA flag equals one, then the buffer address specifies the address of the buffer list and the buffer size specifies the sum of the counts in the buffer list. The buffer list is continuous and stored with the following format: /Data Address, Count/Data Address, Count/. . . Data Address is a four byte pointer and Count is a 16 bit count specifying the data length in bytes.

The following TABLE I lists in the left hand column outbound interface commands which the control unit 44 can transmit to either adapter 46 or 48, and in the right hand column, the interface responses that the adapter transmits to the control unit corresponding to the commands. TABLE II lists the interface commands and responses in the other direction.

TABLE I

| levl 1 - levl 2 | levl 2 - levl 1 |
|---|---|
| Open | Open-Ack |
| Close | Close-Ack |
| MsgOut | MsgOut-Accepted |
| Reset | Reset-Complete |
| Online | Online-Ack |
| Offline | Offline-Ack |
| Terminate | Msgbuf-Available |
| | Error |

TABLE II

| levl 1 - levl 2 | levl 2 - levl 1 |
|---|---|
| Open | Open-Ack |
| Close | Close-Ack |
| MsgIn-Accepted | MsgIn-1 |
| MsgIn-Accepted | MsgIn-Q |
| Reset | Reset-Complete |
| Offline | Offline-Ack |
| Online | Online-Ack |
| | Terminate |

"Level 1" refers to the control unit 44 and "level 2" refers to either adapter 46 or 48.

The following are definitions of each of the outbound and inbound commands:

OPEN: The Open command is used to define a logical link between a Level 1 process and a Level 2 process. This link between Level 1 and Level 2 will remain active until a Close/Close_Ack command sequence has been completed. Level 1 will send the Open command to Level 2 when the data port is started during the execution of a PWRITE CCW (described in more detail below in reference to FIGS. 6 and 8).

OPEN_ACK: Level 2 must respond to a Level 1 Open command with an Open_Ack. Level 2 will set the Sense parameter of the command to 0 if the Open is accepted establishing a Level 1/Level 2 logical link. A nonzero Sense value will cause Level 1 to terminate the channel program. If Level 2 accepts the open then Level 2 sets Buffer Address with the address of an available outbound buffer and sets Buffer Size to the maximum outbound buffer size.

CLOSE: Level 1 will issue a Close command to Level 2 whenever Level 1 detects a data port termination condition such as a Halt I/O instruction from processor 21 or detection of an adapter error condition.

CLOSE_ACK: Level 2 must issue a Close_Ack command to Level 1 after receiving a Close command from Level 1. The Close_Ack will terminate the Level 1/Level 2 link. Level 1 will wait until a Close_Ack is received from Level 2 before giving the termination status to the channel. Level 1 will not send any more commands to Level 2 until the Close_Ack is received from Level 2.

MSGOUT: Level 1 issues a MsgOut command whenever an outbound message has been transferred to an outbound buffer and there is no acknowledge pending from Level 2 for a previous command. Level 1 will not send any more commands to Level 2 until a MsgOut_Accepted command is received from the Level 2 process. The Buffer Address and Buffer Size parameters indicate the outbound buffer that contain the message. These parameters were set in the command block received from Level 2 in the last Open_Ack, MsgOut_Accepted, or Msgbuf_Available command.

MSGOUT_ACCEPTED: Level 2 must issue a MsgOut_Accepted command to Level 1 after receiving a MsgOut command. The MsgOut_Accepted control block will contain a pointer to the next available Level 2 outbound buffer if no errors are indicated in the Sense parameter of the command block.

MSGIN_1: Level 2 issues a MsgIn_1 command when it has only one message to transfer. Level 1 will send the MsgIn_Accepted command to Level 2 after Level 1 has transferred the CETI message to 370 storage.

MSGIN_Q: Level 2 issues a MsgIn_Q command when there is more than one message to be transferred. Level 1 will transfer one message to S/370 memory and issue the MsgIn_Accepted command. Level 1 may skip the SYNC CCW (FIGS. 6 and 8) in the inbound data port channel program when Level 2 uses the MsgIn_Q command. Level 2 must issue a MsgIn_1 command or a MsgIn_Q command for every message that is to be processed by Level 1.

MSGIN_ACCEPTED: This command is sent to Level 2 after Level 1 has transferred a CETI message from the Level 2 buffer to 370 storage.

RESET: Level 1 issues the RESET command after a S/370 reset to a data port (e.g. CLRIO, CLRCH, etc...). Level 1 will wait for a RESET_Complete response from Level 2 before sending another command to Level 2. If there is an open link between Level 1 and Level 2, Level 1 will first perform a close operation to Level 2 before sending the reset command.

RESET_COMPLETE: This command is issued by Level 2 after the Level 2 reset function has been completed. Level 1 and Level 2 will enter the online state at completion of the reset operation.

OFFLINE: The Offline command will be sent to Level 2 to indicate that the service processor requires control of the hardware adapter for diagnostic purposes. Level 2 will be required to give up control of the adapter by unhooking interrupt handlers.

OFFLINE_ACK: Level 2 must send an Offline_Ack command to Level 1 in response to an Offline command to indicate that the Offline state has been reached.

ONLINE: Level 1 will send an Online command to Level 2 to indicate that the service processor has given control of the adapter back to the emulators. Level 2 will re-install its interrupt handlers and perform any operations necessary to begin processing CETI messages. Level 2 should return to the reset state.

ONLINE_ACK: Level 2 must send an Online_Ack command to Level 1 when Level 2 has finished processing the Online command and returned to a reset state.

MSGBUF_AVAILABLE: Level 2 will issue a Msgbuf_Available command to Level 1 to identify an empty Level 2 buffer if Level 2 had previously indicated to Level 1 that there were no Level 2 buffers available. The Buffer Address and Buffer Size parameters identify the empty buffer. A Msgbuf_Available command will be sent by Level 2 only if a previous Open_Ack or MsgOut_Accepted command was sent with the Buffer Address field set to NULL.

ERROR: Level 2 sends an ERROR command to indicate an asynchronous level 2 error (e.g. adapter hardware error, LAN failure, etc...). The ERROR control block contains the sense information that will be reported to the 370 application. Level 1 does not acknowledge this command to Level 2. Level 2 must continue to process Level 1 commands after sending an ERROR command.

TERMINATE: Level 1 will send the TERMINATE command to all Level 2 processes of a CETI group when the control port for the group has terminated its channel program. There is no response from Level 2 for this command. Level 1 will close any open links between Level 1 and Level 2 before issuing this command.

Figure 4:
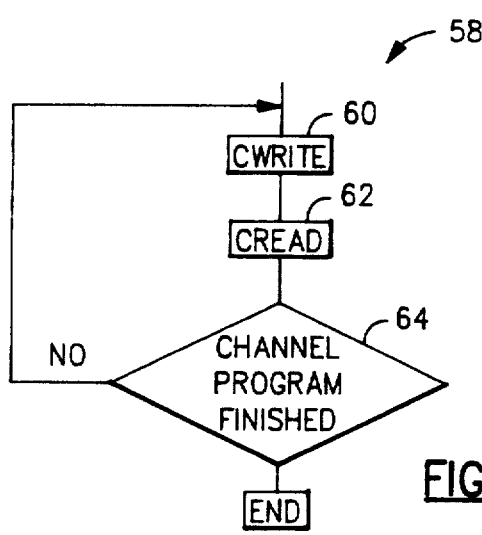
FIG. 4 is a flowchart illustrating a control port channel program comprising commands which are generated by the main computer and presented to the control port of the common channel and control unit.

FIG. 4 is a flowchart illustrating the steps of a control port channel program 58, which channel program is stored in memory 23, initiated by processor 21, and communicated to control unit 44 via bus 31 and channel 42. Channel program 58 comprises alternating CWRITE and CREAD steps 60 and 62, respectively until the channel program is completed, decision block 64. This example of READ and WRITE operations (FIGS. 4-5) within the framework of a channel program illustrate the use of the universal channel and control unit 32 and universal protocol interface of tables 1 and 2 according to the present invention. However, it should be understood that the present invention is applicable to other types of computer architectures which do not utilize a channel program. Channel program 58 begins with a transmission of a start I/O command to channel 42. The start I/O command causes channel 42 to respond to channel program 58. The channel 42 fetches CWRITE channel control word 60 from memory 23. In response to CWRITE 60 (or CREAD 62), the channel recognizes from the channel control word whether the data is chained or singular, recognizes whether the command is chained or singular, verifies that the channel control word is valid, and also performs other functions. If the command is a single CWRITE command, then the channel notices which device is being addressed by the channel control word and the corresponding port as viewed from the processor 21. Then, the channel 42 passes the CWRITE command to the control unit corresponding to the device address which, in the illustrated embodiment, is the lone control unit 44 servicing both I/O devices 22 and 24.

Figure 5:
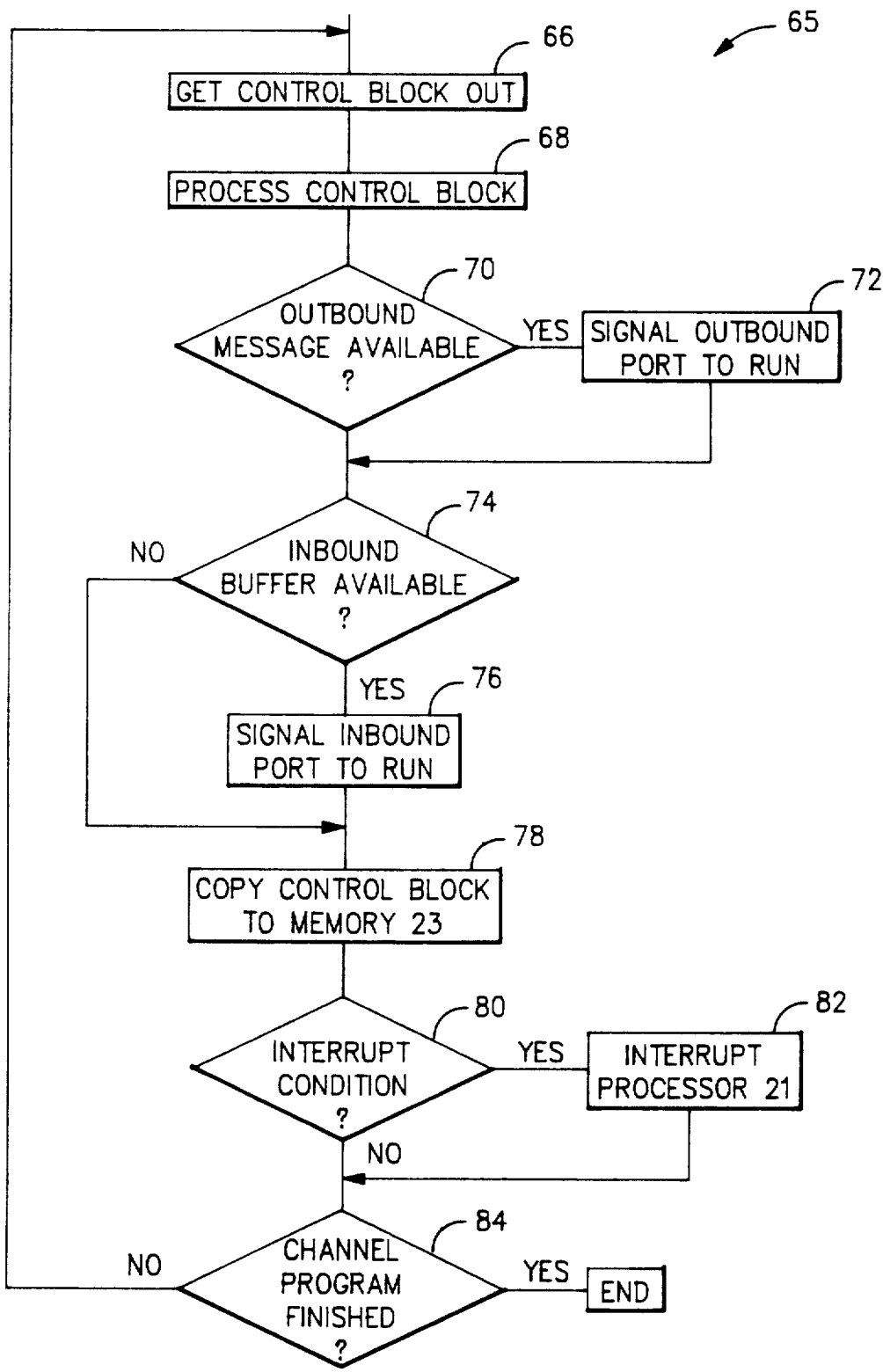
FIG. 5 is a flowchart of microcode executed by the control port in response to the channel program of FIG. 4.
Figure 7:
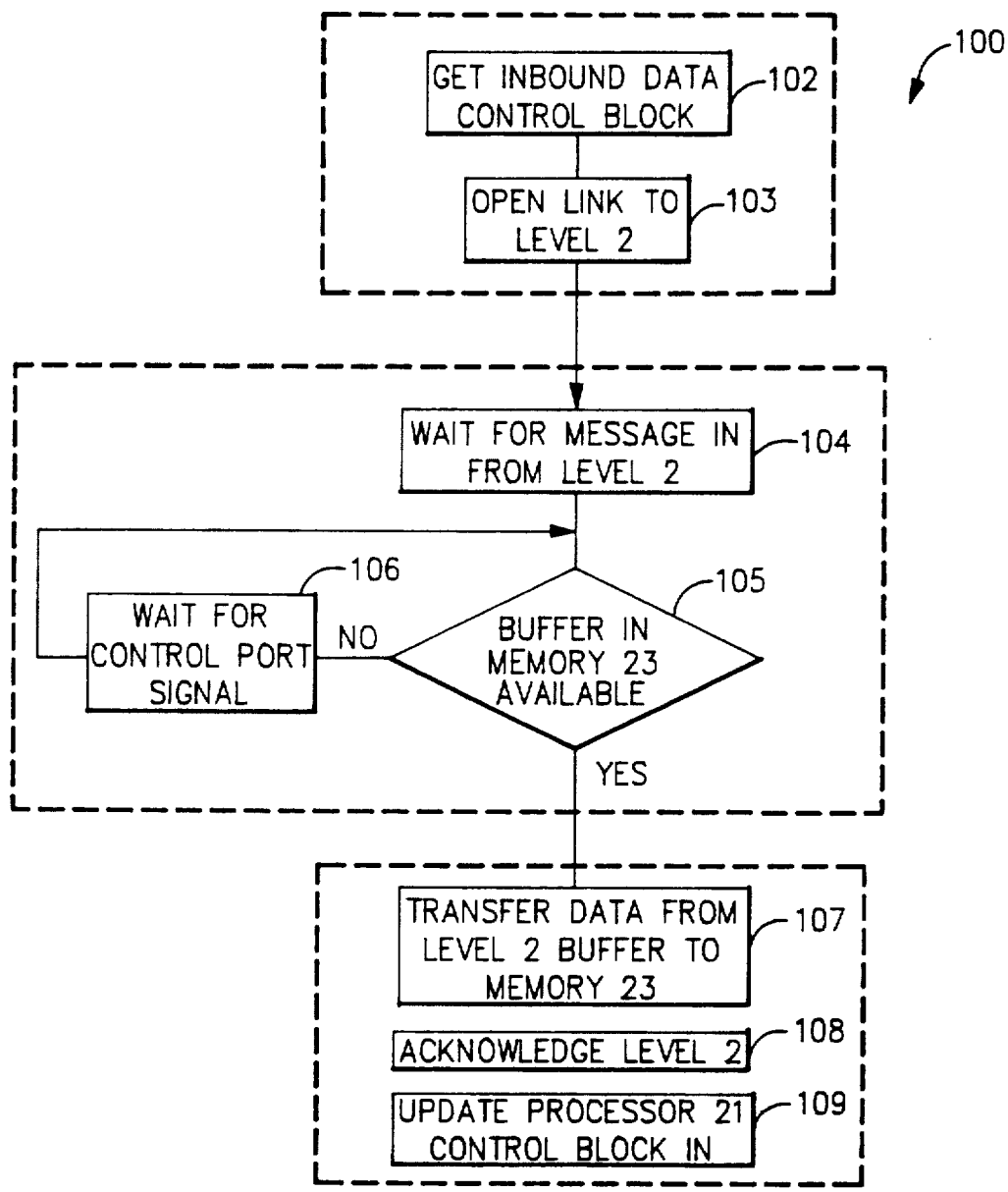
FIG. 7 is a flowchart of microcode executed by the inbound data port in response to the channel program of FIG. 6.

Next, control unit 44 executes the steps of microcode 65 illustrated in FIG. 5 corresponding to the CWRITE command. First, control unit 44 gets the control block from channel 42 (step 66), and then processes the control block (step 68). During the course of steps 66 and 68, the control unit 44 requests the control block from channel 42, and channel 42 fetches the control block from memory 23. The control block indicates to the control unit 44 when there are CETI messages to transfer, either inbound or outbound. If there are messages to transfer outbound (step 70) the control unit 44 signals an outbound port to run (step 72), as illustrated in FIGS. 8-9. If there are messages to transfer inbound (step 74), the control unit 44 signals an inbound port to run (step 76), as illustrated in FIGS. 6-7.

Next, channel 42 passes the CREAD 62 command to the control unit 44. Control unit 44 executes steps of microcode beginning at step 78. Control unit 44 transfers a control block into memory 23 signalling any CETI message transfers that have been completed. If an interrupt condition exists (step 80), such as an overload condition or excessive delay before all the data is collected, the control unit 44 interrupts the processor 21 to signal the condition (step 82). The foregoing steps 66-82 are repeated (step 84) until terminated by either an error condition or processor 21.

CETI messages are read via the inbound data port of control unit 44 and adapter 46 or 48. This inbound data port (including a processor not shown) is programmed into a READ mode by an inbound data port channel program 90 initiated by processor 21, and illustrated in FIG. 6. Program 90 generates an initial (one-time) PWRITE channel control word 92 which includes the address of the inbound data port, and starts inbound data port microcode 100 running (FIG. 7). In response to the PWRITE channel control word 92, the microcode gets the inbound data control block from the channel control word (step 102) and attempts to open a communication link with the corresponding adapter (step 103) by transmitting the "OPEN" command. The adapter responds with an "OPEN ACKNOWLEDGE".

The next channel control word in the inbound data port channel program is SYNC 94 (FIG. 6) which causes the inbound data port to wait for a MESSAGE_IN signal from the adapter (step 104). If there is no buffer available in memory 23 (step 105), the inbound data port waits for a signal from the control port (step 106) to indicate that an inbound buffer is available in memory 23. Then, the inbound data port processes a DREAD channel control word 97 from processor 21. When the DREAD channel control word 97 is received by the inbound data port, the inbound data port transfers data from the adapter to memory 23 (step 107), and then acknowledges the data transfer to the adapter with the MESSAGE_IN acknowledge (step 108). In further response to the DREAD channel control word 97, the inbound data port updates the control block of the control port channel program 58 (FIG. 4) (step 109).

CETI messages are written via the outbound data port of control unit 44 and adapter 46 or 48. This outbound data port (including a processor not shown) is programmed into a WRITE mode by an outbound data port channel program 130 initiated by processor 21, and illustrated in FIG. 8. Program 130 generates an initial (one-time) PWRITE channel control word 131 which includes the address of the outbound data port and starts outbound data port microcode 150 (FIG. 9). In response to the PWRITE channel control word 131, the microcode gets the outbound data control block from the channel control word (step 151) and attempts to open a communication link with the corresponding adapter (step 152) with an "OPEN" command. The adapter responds with an "OPEN ACKNOWLEDGE". Also, the adapter transmits to the output data port an outbound buffer pointer which identifies a location in memory to receive the data (step 153).

The next channel control word in the outbound data port control program is SYNC 134 (FIG. 8) which causes the outbound data port to wait for a signal from the control port indicating that a CETI outbound message is available. (step 154). Then, the outbound data port receives a DWRITE channel control word 135 from processor 21 (step 154), and responds by transferring the data from memory 23 to the adapter (step 155), and notifying the control port. Then, the outbound data port waits for a MESSAGE OUT ACKNOWLEDGE from the adapter (step 158) and upon receipt, updates a COMPUTER CONTROL BLOCK IN of the control port channel program 58 (step 159).

When the channel program is terminated (steps 98 and 140), for example, when a Halt is issued by processor 21, communication with adapters 46 and 48 is closed. The closure is effected by control unit 44 issuing a "Close" command and the I/O adapter responding with a "Close-Ack".

The foregoing example of FIGS. 4-9 illustrates the use of the universal control unit 44 and most of the interface signals. The use of the other signals is indicated above in the definitions of the interface signals.

Based on the foregoing, a universal control unit and protocol interface according to the present invention have been disclosed. However, numerous modifications and substitutions may be made without deviating from the scope of the invention. Therefore, the invention has been disclosed by way of illustration and not limitation, and reference should be made to the following claims to determine the scope of the invention.

We claim:

1. A computer system which supports communication with a plurality of different, external devices, said system comprising:

a main computer exhibiting a first I/O program protocol having a first set of programming interface commands, said main computer including means for issuing said programming interface commands to control communication with the external devices;

an I/O processor coupled to said main computer;

programmed channel means, executing on said I/O processor, for receiving said programming interface commands issued by said main computer and supporting communication between said main computer and said I/O processor according to said first I/O program protocol;

a plurality of different I/O adapters external to and coupled to said I/O processor; and a common control unit including one instance of program code means executing on said I/O processor for executing said programming interface commands issued by said main computer, processing a control block provided by said programmed channel means, said control block indicating when there are messages to transfer inbound or outbound of said main computer pursuant to said programming interface commands, processing flow of said inbound and outbound messages, managing buffers for said inbound and outbound messages, providing a second I/O program protocol having a second set of programming interface commands and controlling communication with said plurality of I/O adapters according to said second I/O program protocol based on said programming interface commands from said main computer, to permit said plurality of I/O devices to communicate with said computer via said I/O processor, said one instance of program code means in said common control unit and said programmed channel means; and wherein each of said I/O adapters exhibits said second I/O program protocol for communicating with said common control unit and exhibits a different I/O program protocol for communicating with a respective device to permit all of said devices to communicate with said main computer, said I/O program protocols for communicating between said I/O adapters and the respective devices being different than each other and different than said first I/O program protocol; and said second I/O program protocol includes the following programming interface commands:

open communication, open communication-acknowledge, close communication, close communication-acknowledge, message out, message out-accepted, message in, message in-accepted, message buffer available, and error.

2. A computer system as set forth in claim 1 wherein said second I/O program protocol also includes the following interface commands:

reset, reset complete, offline, offline acknowledge, online, online acknowledge and terminate.

3. A computer system as set forth in claim 2 wherein all of said interface commands form a substantially complete set of interface commands whereby no significant additional interface commands are utilized in said second I/O program protocol between said common control unit and said plurality of I/O adapters.

4. A computer system as set forth in claim 1 wherein
said main computer includes means for transmitting read and write commands to said common control unit via said programmed channel means with an address corresponding to either one of said I/O adapters or the corresponding device, and in response to said read and write commands and said address, said common control unit includes means for opening a communication link with the addressed I/O adapter, subsequently receiving an acknowledgement of the open communication from said I/O adapter, accepting a message from the addressed I/O adapter responsive to said read command, and sending a message to said addressed I/O adapter responsive to said write command.

5. A computer system as set forth in claim 1 wherein said main processor utilizes a System 370 architecture.

6. A computer system as set forth in claim 5 wherein said I/O adapters comprise a Token Ring adapter and an Ethernet adapter.

* * * * *